United States Patent [19]

Häusler et al.

[11] Patent Number: 4,541,720
[45] Date of Patent: Sep. 17, 1985

[54] APPARATUS FOR PHASE SYMMETRIZING OPTICAL WAVE FRONTS

[75] Inventors: Gerd Häusler, Erlangen; Walter Järisch, Boeblingen; Günter Makosch, Sindelfingen-Maichingen, all of Fed. Rep. of Germany

[73] Assignee: International Business Machines Corporation, Armonk, N.Y.

[21] Appl. No.: 442,950

[22] Filed: Nov. 19, 1982

[30] Foreign Application Priority Data

Nov. 25, 1981 [EP] 11251981 ............................ 81109873

[51] Int. Cl.$^4$ .............................................. G01B 9/02
[52] U.S. Cl. .................................... 356/345; 356/353; 356/354
[58] Field of Search ............... 356/345, 353, 354, 359, 356/360; 350/173, 286

[56] References Cited

U.S. PATENT DOCUMENTS 4,167,337 9/1979 Jaerisch et al. ................. 356/360 X

OTHER PUBLICATIONS

Sen et al., "Shearing Interferometers for Testing Corner Cubes and Right Angle Prisms", *Applied Optics*, vol. 5, No. 6, pp. 1009-1014, 6/66.
Ohtsuka, "Proposal for the Determination of the Complex Degree of Spatial Coherence", *Optics Letters*, vol. 1, No. 4, pp. 133-134, 10/77.
Carnevale et al., "Spatial Coherence Analysis by Interferometric Methods", *Optica Acta*, vol. 24, No. 11, pp. 1099-1104, 11/77.

*Primary Examiner*—Davis L. Willis
*Assistant Examiner*—Matthew W. Koren
*Attorney, Agent, or Firm*—Ronald L. Drumheller

[57] ABSTRACT

Interferometric devices wherein two beams (the object and reference beams) interfere are rendered insensitive to deformations in the ideally planar wave fronts of the two beams by making the deformations identical through optical phase mixing. For arrangements wherein the beams to be superposed upon each other are symmetrically guided, phase symmetrized output beams are formed from a common input beam by making the input beam perpendicularly incident upon a partially reflecting hypotenuse face of a roof prism or axicon. Rays positioned symmetrically with respect to the center plane of the prism or the center axis of the axicon become mixed because the portion of each reflected by the hypotenuse face becomes superposed with the transmitted portion of the other after total reflection inside the prism or axicon, yielding two output beams with a symmetrical phase distribution with respect to the center plane of the prism or the center axis of the axicon.

10 Claims, 6 Drawing Figures

APPARATUS FOR PHASE SYMMETRIZING OPTICAL WAVE FRONTS

DESCRIPTION

Technical Field

This invention relates to interferometers and interferometric methods and more particularly to optical phase mixers for use in interferometric apparatus.

Background Art

In many optical devices, and in particular interferometric measuring and test devices, the shape of the optical wave fronts used is of considerable importance. Interferometric measuring methods, for example, frequently use plane wave fronts for the two original beams (the object and reference beams). After the object beam has been reflected at, or after it has passed, the object to be tested, the object and reference beams are superposed on each other. If the original wave fronts of the two superposed beams are not exactly planar, or they are deformed differently, even ideal test objects produce distorted or additional interference lines which may be misinterpreted as errors of the test object.

Deformations of the wave front of a beam may be caused by imperfect optical components in the optical beam path. A chief source of such deformations are collimator systems, which convert the light of a point-shaped light source into an output beam with planar wave fronts.

FIG. 1 is a sketch of a prior art collimator for expanding a laser beam. The output of a laser 10 is focussed by a positive lens 11 into the small aperture of a pinhole diaphragm 12 positioned at the focal point of a collimator lens system 13. The pinhole diaphragm 12 with an aperture ranging from 1 to 10 $\mu$m serves as a spatial filter for removing undesired components from the beam. It is also possible to use a mirror collimator system instead of the lens system 13. When the collimator system is ideally focussed and free from errors, the wave fronts of the output beam 14 should be exactly planar. Transparent plates, mirrors or gratings may be used to split this output beam into object and reference beams for use in an interferometric measuring arrangement.

However, ideal conditions do not exist in practice, since there are neither ideally point-shaped light sources nor ideally error-free optical systems. The real wave fronts 15 of the output beam 14 are deformed (FIG. 1B). The quality of the deformed wave is indicated by a maximum deviation $\Delta_{max}$ from an ideal plane measured across the entire wave front. This value $\Delta_{max}$ increases with the diameter of a collimator system and, in particular for output beam 14 of more than 100 mm diameter, cannot be reduced to less than $\lambda/4$ to $\lambda/8$, where $\lambda$ is the wavelength of the light. With such deformations, interferometric measurements cannot be made with a maximum degree of accuracy. Only in a few cases can the resulting distortions of interference lines be corrected by computational means. For highly accurate measurements, individual collimator systems must be checked for minimum wave front distortions and selected or adjusted accordingly.

Disclosure of the Invention

It is the object of this invention to provide interferometric apparatus and methods wherein the influence of deformed wave fronts is greatly reduced and wherein phase mixers are provided for such purpose.

This invention is based upon the observation that when two beams are interferometrically superposed upon each other, local deformations of the wave front do not distort interference lines or produce additional interference lines so long as both superposed beams have exactly the same deformations. In other words, the wave phase for both beams must be identical at all points of the beam cross-sections corresponding to each other.

For generating two beams with corresponding spatial distributions (wave front deformations), the invention utilizes the further observation that in many interferometric devices the optical paths of the object and reference beams are such that there are simple symmetry relations between the two beams. In accordance with this invention, if the object and reference beams are used such that wave front deformations which are symmetrical to each other with respect to a plane cancel each other, then symmetrization can be obtained by phase mixing an input beam with a 90° prism. For symmetries about an axis of rotation, phase mixing is done by using an axicon.

Since the regularly confined faces of a prism or an axicon can be produced at reasonable expense with much greater precision than the spherical faces of a collimator system, phase mixing in accordance with this invention allows inexpensive collimator systems with large beam diameters and equally large wave front deformations to be used in interferometric measurement systems. Furthermore, measurements can be made at an improved degree of accuracy if phase mixing apparatus in accordance with this invention is used in combination with a very accurate collimator system.

BRIEF DESCRIPTION OF THE DRAWINGS

Examples of the invention will now be described in detail by reference to the drawings in which.

BEST MODE FOR CARRYING OUT THE INVENTION

Figure 1A:
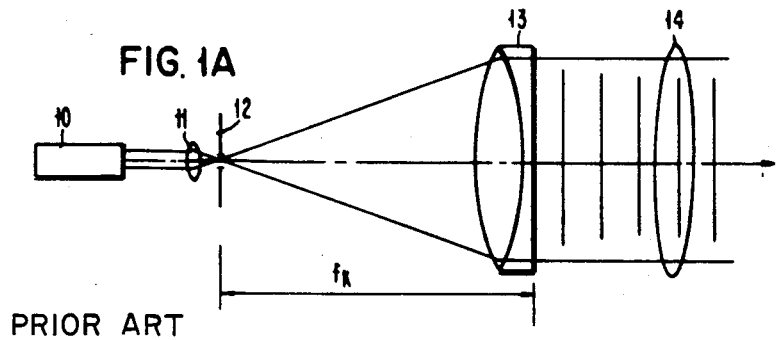
FIGS. 1A and 1B illustrate a prior art collimator system and the wave front deformations introduced thereby.
Figure 1B:
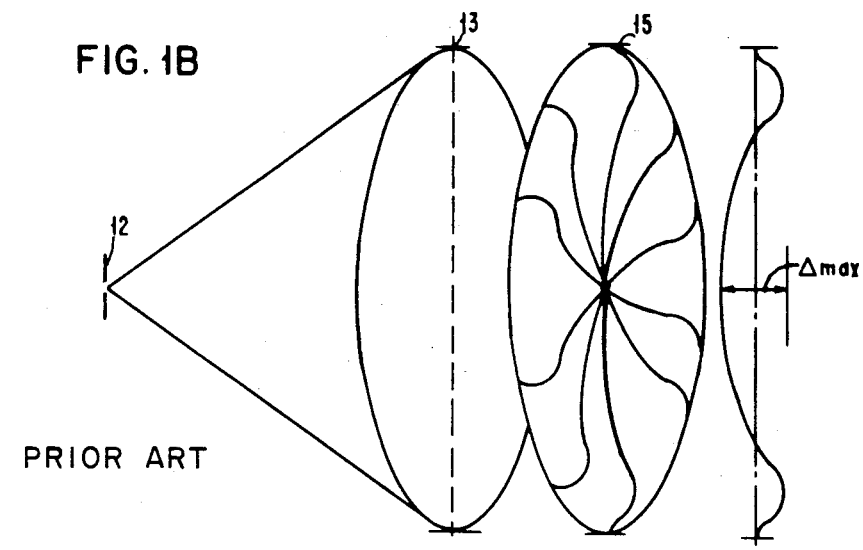
Figure 2:
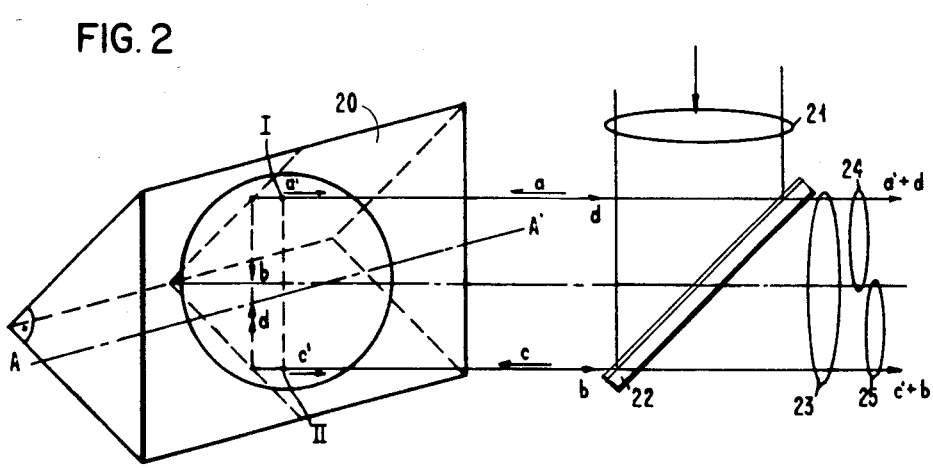
FIG. 2 shows a prism used as a phase mixer.

In FIG. 2, a roof prism 20 with a vertex angle of 90° is proposed for phase mixing. An output beam 23 is generated which, with respect to the plane extending through the axis AA' and the vertex line of the prism 20, has a symmetrical phase distribution in the two beam halves 24, 25. An input beam 21 to be phase mixed, e.g., from a laser, is perpendicularly directed by a semireflecting mirror 22 onto the hypotenuse face of the prism 20. Two rays a, c, extending symmetrically with respect to line AA', are partially reflected (rays a', c') at the partially reflecting hypotenuse face of the prism, and partially enter the prism (rays b, d). After being reflected twice at the fully reflecting short faces of the prism, the entering ray components b, d leave the prism at points II and I, respectively, where the rays a', c' were directly reflected. With the arrangement being ideally adjusted, rays a' and c' and b and d, respectively, upon reaching points I, II have covered optical paths of the same length, so that the output rays a'+d and c'+b, respectively, which are symmetrical to line AA', have the same intensities and phases.

When a phase mixer according to FIG. 2 is used in an interferometric arrangement, no additional deformations of the wave front are introduced if state-of-the-art manufacturing tolerances for the prism are adhered to. The faces of a prism and a beam splitter can be polished with a planarity tolerance of $\lambda/20$ by up-to-date grinding and polishing methods; the vertex angle of a prism can be fabricated to an accuracy of 1/100 arc second. An equivalent accuracy for the phase mixer can be obtained by adjusting the angle of incidence of beam 21 with respect to the hypotenuse face of the prism 20.

Figure 3:
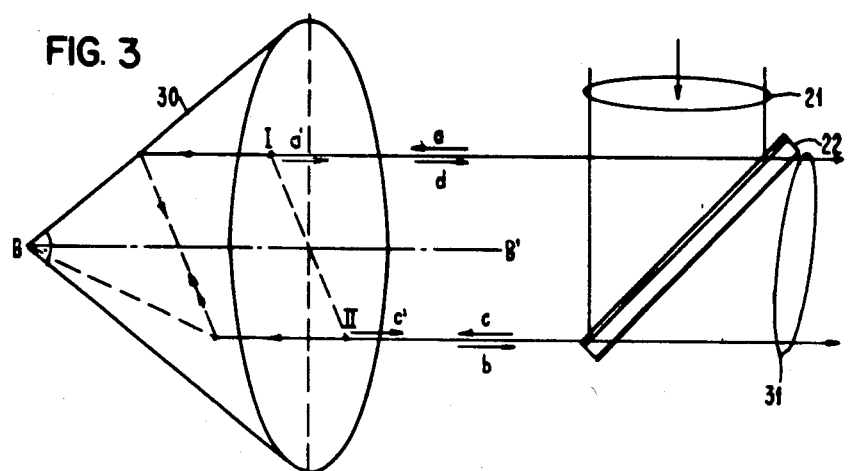
FIG. 3 shows an axicon used as a phase mixer.

FIG. 3 shows an arrangement for phase mixing, wherein the wave front deformations in the output beam 31 are rotationally symmetrical to axis BB'. Using the same basic arrangement as in FIG. 2, the prism is replaced by an axicon 30 shaped like a cone with an apex angle of 90°. The base is partially reflecting and the lateral area is fully reflecting. The beam path corresponds to that in FIG. 2, except for the rotational symmetry; equivalent elements and ray components are marked by the same reference numbers. Since the rotational symmetry produced by the axicon is also mirror symmetric, the axicon phase mixer can always be used in place of the prism phase mixer, but not vice versa. However, the limited range of application for the prism phase mixer is compensated for by the fact that prisms are easier to manufacture than axicons.

Figure 4:
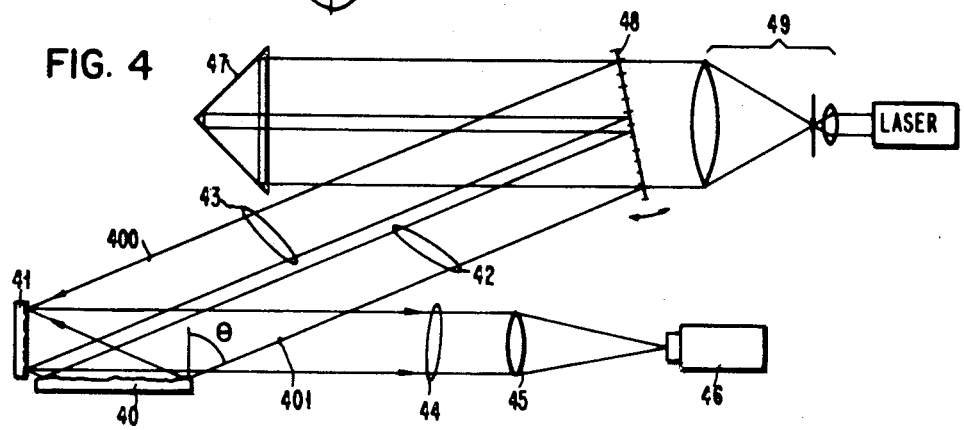
FIG. 4 schematically illustrates an optical apparatus for testing surfaces which incorporates a phase mixer in accordance with FIG. 2.

FIG. 4 shows a first application of the phase mixer according to FIG. 2 in an interferometric arrangement for surface testing. In this arrangement, which is described in detail in German Auslegeschrift No. P 26 36 498, which is hereby incorporated by reference, a first beam (object beam) 42 is directed at an angle of incidence $\theta$ onto surface 40 to be tested from which it is reflected onto a grating 41 for diffraction. A second beam (reference beam) 43 is directed at an oblique angle onto grating 41 where it is also diffracted. The grating period and angle of incidence are such that the desired diffraction orders of the two beams 42 and 43 extend parallel to each other and an output beam 44 is generated, which is directed by a lens 45 onto a TV camera 46 for evaluation. The resulting contour lines can be evaluated either visually or by an automatic image evaluator.

With this type of beam guidance in an interferometric surface test system, corresponding rays from each beam 42, 43 (e.g., 400 and 401) which are symmetrical to the dividing plane of the two beams, are made to interfere. Thus, phase symmetrization can be effected by a phase mixer comprising a prism 47 and a beam splitter 48, which optically follows the beam expansion and collimator system 49. In contrast to the beam path of FIG. 2, the prism 47 in this case is directly illuminated with the collimator output beam (which is perpendicularly incident upon the base of the prism), and the symmetrized beams are coupled out by reflection at the beam splitter 48. The side of the beam splitter 48 facing the collimator 49 need not meet particularly stringent planarity requirements; but the front side, at which the symmetrized beams are reflected, must be as planar as possible (accuracy $\lambda/20$ to $\lambda/40$). In the beam splitter according to FIG. 2, the two reflective sides must be fabricated with very great precision, as otherwise the symmetrized beam would again be disturbed. The arrangement according to FIG. 4 does not have this disadvantage and is therefore preferable. The beam splitter 48 is pivotable about the center axis and can also be displaced, so that the stationary measuring arrangement 40, 41 can be illuminated at an arbitrary angle $\theta$.

Figure 5:
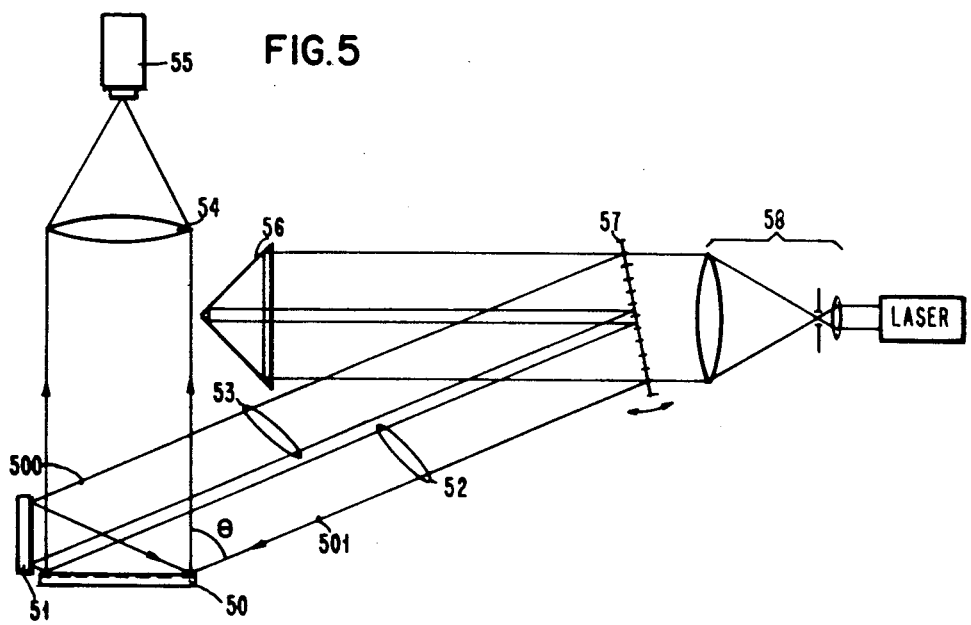
FIG. 5 is another schematic illustration of an optical testing apparatus which incorporates a phase mixer in accordance with FIG. 2.

FIG. 5 shows a further application of a prismatic phase mixer for testing the quality of optical image systems; details of this arrangement are described in European Patent Application No. 81 103 162.4, which is hereby incorporated by reference. The contact print of a master grating is compared in two successive interferometric measuring steps with a copy generated by the image system to be tested. For this purpose, each grating (the individual gratings being successively caused to assume position 50) is directly illuminated by a beam 52 at an angle of incidence $\theta$ and is indirectly illuminated at the same angle $\theta$ symmetrically to the first beam 52 by a second beam 53 reflected at a plane mirror 51. Thus, corresponding rays from each beam which are symmetrical to the dividing plane between the two beams 52 and 53 (e.g., 500, 501), interfere at each point of the grating 50. In this case also, a prism 56 and a beam splitter plate 57 optically following a beam expansion and collimator system 58 are used to symmetrize the phases in both beams 52 and 53. The beam path in this phase mixer also corresponds to that described by means of FIG. 4.

Maximum accuracy is highly important when optically testing the image quality of high resolution optical systems, e.g., photolithographic apparatus.

With the limited optical quality of previous collimator systems, high accuracy was obtainable only by generating the two beams 52 and 53 using separate optimally corrected collimators with relatively small lens diameters. By using phase mixing in accordance with this invention there are no such restrictions, since even collimators with large diameters permit the necessary measuring accuracy. Instead of a second collimator system, an accurately fabricated plane mirror 51 is positioned at exactly 90° with respect to grating 50, so that the angles of incidence upon grating 50 of the two beams 52 and 53 are always identical irrespective of the absolute value. The period of grating 50 is such that the superposed + and − nth diffraction orders of the beams 52 and 53 extend perpendicularly to the grating plane and are imaged into the optical system 54, 55. The fourth diffraction order (n=4), for example, corresponds to an angle of $\theta$ equal to 39.5°.

By using the apparatus illustrated in FIG. 5, image quality of a copy may be compared with a master in one coordinate direction. Testing in two coordinate directions (x and y) can be done at the same time if two grating patterns oriented perpendicularly to each other (or radial gratings) are used as a test pattern. In such cases a rotationally-symmetrical phase mixer (axicon) is used.

In addition to the applications described in detail, this method of phase mixing may be used with all optical devices in which two beams are superposed for interference (e.g., interferometry in accordance with Michelson, Mach-Zehnder, Jamin, Fabry-Perot, Lloyd, generating grating patterns by two overlapping plane waves, etc.). In each case the symmetries of the interfering rays must be considered in order to decide whether a prism is sufficient for phase mixing or whether an axicon should be used.

Having thus described our invention, what we claim as new, and desire to secure by Letters Patent is:

1. In an interferometric method requiring both an input object beam and an input reference beam with substantially identical wave fronts, the steps comprising:

forming two optical beams with substantially planar wave fronts, but which possibly have different local wave front deformation; and optically mixing said two optical beams to form an input object beam and an input reference beam with substantially identical wave fronts.

2. A method as defined in claim 1, wherein two symmetrical partial beams are formed from an input beam, and said two symmetrical partial beams are mixed to form said input object and reference beams by superposing a portion of each partial beam with a portion of the other partial beam which has been shifted by a fixed phase.

3. An optical phase mixer for generating an input object beam and an input reference beam with substantially identical wave fronts for use in inferometer aparatus, comprising:

means for generating an input optical beam with an approximately planar wave front;

a roof prism having a vertex angle of 90°, the hypotenuse face of said roof prism being partially reflecting and the short faces of said roof prism being fully reflecting; and means for directing said input optical beam at an angle of incidence of 90° onto the hypotenuse face of said roof prism, whereby light reflected from the hypotenuse face and light reflected from the short faces mix to produce two symmetrical output optical beams with substantially identical wave fronts for use as the input object and reference beams in interferometer apparatus.

4. An optical phase mixer as defined in claim 3 and further comprising an optical beam splitter positioned in front of the roof prism for coupling out the symmetrical output beams.

5. An optical phase mixer as defined in claim 4 wherein the optical faces of the roof prism and the beam splitter side facing the roof prism are formed to an accuracy of $\lambda/20$ or better, where $\lambda$ is the wavelength of the light being mixed.

6. An optical phase mixer as defined in claim 5 wherein the symmetrized output beams are the reference and object beams of an interferometric surface testing apparatus in which the reference beam is directly obliquely incident upon a reflection grating and the object beam is obliquely incident upon the reflection grating after reflection from the surface of an object to be tested.

7. An optical phase mixer as defined in claim 5 wherein the symmetrized output beams are incident at identical angles upon a grating to be tested, one beam being directly incident upon the grating and the other beam being incident upon the grating after reflection at a planar mirror positioned perpendicularly to the grating.

8. An optical phase mixer for generating an input object beam and an input reference beam with substantially identical wave fronts for use in interferometer aparatus, comprising:

means for generating an input optical beam with an approximately planar wave front;

an axicon having a vertex angle of 90°, the base face of said axicon being partially reflecting and the conical face of said axicon being fully reflecting; and means for directing said input optical beam at an angle of incidence of 90° onto the base face of said axicon, whereby light reflected from the base face and light reflected from the conical face mix to produce two rotationally symmetrical output optical beams with substantially identical wave fronts for use as the input object and reference beams in interferometer apparatus.

9. An optical phase mixer as defined in claim 8 and further comprising an optical beam splitter positioned in front of the axicon for coupling out the rotationally symmetrical output beams.

10. An optical phase mixer as defined in claim 9 wherein the optical faces of the axicon and the beam splitter side facing the axicon are formed to an accuracy of $\lambda/20$ or better, where $\lambda$ is the wavelength of the light being mixed.

* * * * *